United States Patent [19]
Saito et al.

[11] 3,981,971

[45] Sept. 21, 1976

[54] PROCESS FOR REDUCING NITROGEN OXIDES

[75] Inventors: Masumi Saito, Kobe; Sumio Tani, Neyagawa; Tateo Ito, Kyoto; Shigeaki Kasaoka, Okayama, all of Japan

[73] Assignee: Kurashiki Boseki Kabushiki Kaisha, Japan

[22] Filed: Sept. 4, 1974

[21] Appl. No.: 503,164

[30] Foreign Application Priority Data

Sept. 13, 1973  Japan............................. 48-103545

[52] U.S. Cl. .............................. 423/239; 423/351; 423/580
[51] Int. Cl.² ...................... B01J 8/00; C01B 17/00
[58] Field of Search ........ 423/235, 239, 351, 213.2, 423/213.5, 213.7; 252/439

[56] References Cited

UNITED STATES PATENTS

| | | | |
|---|---|---|---|
| 2,361,825 | 10/1944 | Doumani ............................. | 252/439 |
| 3,223,652 | 12/1965 | Erickson et al. ..................... | 252/439 |
| 3,565,830 | 2/1971 | Keith et al. .......................... | 252/439 |
| 3,695,828 | 10/1972 | Gersen et al. ...................... | 423/239 |
| 3,857,921 | 12/1974 | Tamura et al. ..................... | 423/239 |

FOREIGN PATENTS OR APPLICATIONS

| | | | |
|---|---|---|---|
| 384,532 | 6/1932 | United Kingdom................. | 423/239 |
| 476,684 | 7/1937 | United Kingdom................. | 423/239 |

*Primary Examiner*—Herbert T. Carter
*Assistant Examiner*—Eugene T. Wheelock
*Attorney, Agent, or Firm*—Wenderoth, Lind & Ponack

[57] ABSTRACT

The reduction of nitrogen oxides is effected by passing stack offgases containing nitrogen oxides over a heavy metal sulfide catalyst in an atmosphere where ammonia is present.

4 Claims, No Drawings

PROCESS FOR REDUCING NITROGEN OXIDES

The present invention relates to a process for reducing nitrogen oxides. More particularly, it relates to a process for reducing nitrogen oxides with a heavy metal sulfide catalyst in an atmosphere where ammonia is present.

Nitrogen oxides in stack offgases may be converted in the atmosphere to nocuous substances by irradiation with sun light. These nocuous substances are considered to be one of causes of "photochemical smog" and its mechanism is now being gradually elucidated. The removal of the nitrogen oxides in the stack gases is regarded as extremely important from a standpoint of environmental pollution prevention. Heretofore, a variety of methods have been proposed for this purpose and may be grouped into three classes: (1) the oxidation of nitrogen oxides; (2) the catalytic reduction of nitrogen oxides; and (3) the catalytic degradation of nitrogen oxides. For example, concerning class (1), the nitrogen oxides are first catalytically oxidized to form nitric acid which in turn is removed by absorption on a carrier or absorption in an alkaline solution, and concerning class (2), the stack gases are first desulfurized to be followed by a catalytic reduction with carbon monoxide, methane, hydrogen or the like. However, catalysts to be used for these methods are likely to be deteriorated by a component, particularly sulfur dioxide, present in the tail gases and the reducing agents have a tendency to react preferentially with oxygen in the tail gases. Accordingly, these methods are unsatisfactory. On the other hand, the method of class (3) involves the degradation of the nitrogen oxides into innocuous substances or nitrogen and oxygen, so that it is favorable in this respect, but it is disadvantageous because of a long period of time generally required for the degradation of the nitrogen oxides.

As the result of extensive studies, the present inventors have found that, when the gases containing nitrogen oxides are brought into contact with a heavy metal sulfide in an atmosphere where ammonia ($NH_3$) is present, the nitrogen oxides are effectively degraded into nitrogen and water. The present invention is based on this discovery.

Therefore, it is an object of the present invention to provide a process for reducing nitrogen oxides to innocuous substances or nitrogen and water. Another object of the present invention is to provide a process for bringing the stack of offgases containing nitrogen oxides into contact with a heavy metal sulfide catalyst in an atmosphere where ammonia is present to degrade the nitrogen oxides into nitrogen and water. Other objects, features and advantages of the present invention will become apparent during the course of the following description and claims.

Ammonia serves as a reducing agent and the use thereof is advantageous because it is not affected by the oxygen present in the tail gases. The amount of ammonia is from about 0.67 to 4 times, preferably about 1 to 3 times, the stoichiometric amount thereof. A heavy metal sulfide serves as a catalyst and is desired because it is not easily deteriorated by sulfur dioxide, steam, oxygen or the like, in particular sulfur dioxide. Illustrative of the catalysts are, for example, copper, manganese, nickel, iron and cobalt sulfides. These catalysts may be employed alone or in combination and with a promoter or a carrier such as, for example, $Al_2O_3$, $Cr_2O_3$, $SiO_2$ or $MgO$. The amount of the sulfide is from 0.05 to 70 weight percent with respect to the weight of the catalyst and carrier. The catalyst of the present invention may be prepared by methods known per se to the art. For instance, the catalyst of the present invention may be prepared according to a method involving the preparation of a supported-on-carrier catalyst which comprises impregnating a carrier such as, for example, particles of $Al_2O_3$ or $SiO_2$ in an aqueous solution containing heavy metal ions and then sintering such a carrier in the presence of hydrogen sulfide or according to a method involving the preparation of a coprecipitated catalyst which comprises stirring a mixture of an aqueous solution containing aluminum ions and heavy metal ions and an aqueous solution of an alkaline sulfide and roasting the precipitates in a stream of air, nitrogen or hydrogen sulfide.

In the practice of the present invention, the stack offgases containing nitrogen oxides to be reduced and gases containing ammonia are introduced into an appropriate tubular reactor filled with said catalyst of the present invention. It is preferred to provide a pre-heating tube so as to pass the stack offgases therethrough prior to leading to the tubular reactor in which the nitrogen oxides are reduced. The pre-heating of the gases to be treated is favorable with respect to the heat management of the tubular reactor. The temperature at the tubular reactor is not particularly limited, but is usually from about 150° to 550° C. and preferably from about 250° to 400° C.

The present invention can readily convert nitrogen oxides to innocuous substances with high efficiency using small equipment, as compared to the wet method which generally requires large equipment and the working up or recycle procedure after a solution containing nocuous substances is treated to render it innocuous, as described herein. The present invention also has some advantages conventional dry methods do not possess. The process of the present invention is advantageous because no deterioration of the catalytic action of a heavy metal sulfide catalyst is caused by sulfur dioxide, oxygen, water or the like present in the stack offgases; no nitrogen oxides are formed by the oxidation of ammonia, used as a reducing agent, with oxygen present in the stack tail gases; and excess or unreacted ammonia is degraded to innocuous substances or free nitrogen and hydrogen, the hydrogen being further oxidized with oxygen to water.

The following examples illustrate the present invention without limiting the same thereto.

EXAMPLE 1

A solution of 12.4 g. of cupric nitrate trihydrate, 14.9 g. of nickel (II) nitrate hexahydrate and 76.9 g. of aluminum nitrate nonahydrate in 523 g. of distilled water was added to a solution of 28.2 g. of sodium sulfide nonahydrate and 28.5 g. of sodium hydroxide in 318 g. of distilled water with stirring. The precipitates formed were then filtered, washed with water, dried at 110° C., calcined for 3 hours at 450° C. while the air was passing and ground to 14 to 20 mesh.

With 1.5 g. of the catalyst obtained as above, a mixed gas containing 200 p.p.m., calculated as $N_2$, of nitrogen oxides, 1,200 p.p.m. of $SO_2$, 10% by volume of $CO_2$, 5% by volume of $O_2$ and 10% by volume of $H_2O$ was passed over the catalyst at a temperature of 400° C. and a velocity of 500 Nml. per minute in the presence of 260 p.p.m. of $NH_3$. A 93% removal of nitrogen oxides was given.

EXAMPLE 2

A solution of 24.5 g. of cupric nitrate trihydrate and 76.0 g. of aluminum nitrate nonahydrate in 521 g. of water was mixed with a solution of 27.9 g. of sodium sulfide nonahydrate and 28.1 g. of sodium hydroxide in 314 g. of water to form a precipitate which in turn was taken up, washed with water, dried for 22 hours at 110° C., calcined for 4 hours at 450° C. while the air was passing and ground to 14 to 20 mesh.

A mixed gas containing 185 p.p.m., calculated as $N_2$, of nitrogen oxides, 1,250 p.p.m. of $SO_2$, 10% by volume of $CO_2$, 5% by volume of $O_2$ and 10% volume of $H_2O$ was passed over 250 mg. of the catalyst prepared above at a temperature of 400° C. and a velocity of 500 Nml. per minute. When 150 p.p.m. of $NH_3$ were used, 46% of nitrogen oxides was removed. With 300 p.p.m. and 450 p.p.m. of $NH_3$ employed under the same conditions as above, 67% and 71% of nitrogen oxides, respectively, were removed. With 4 g. of the said catalyst and 300 p.p.m. of $NH_3$, a nearly 100% removal of nitrogen oxides was given.

EXAMPLE 3

Using a solution of 6.62 g. of nickel (II) nitrate hexahydrate, 5.50 g. of cupric nitrate trihydrate, 102.5 g. of aluminum nitrate nonahydrate and 11.7 g. of magnesium nitrate hexahydrate in 608 g. of water and a solution of 12.5 g. of sodium sulfide nonahydrate and 53.0 g. of sodium carbonate in 505 g. of water, a catalyst was prepared in the same manner as in Example 1.

A mixed gas containing 250 p.p.m., calculated in $N_2$, of nitrogen oxides, 1,100 p.p.m. of $SO_2$, 10% by volume of $CO_2$, 5% by volume of $O_2$ and 10% by volume of $H_2O$ was passed over 250 mg. of the catalyst at a temperature of 400° C. and a velocity of 500 Nml. per minute in the presence of 170 p.p.m. of $NH_3$ to give a 57% removal of nitrogen oxides. With 340 p.p.m. and 510 p.p.m. of $NH_3$ gave a 75% and 81% removal of nitrogen oxides, respectively. With 1.75 g. of the said catalyst and 340 p.p.m. of $NH_3$, a 96% removal of nitrogen oxides was given.

EXAMPLE 4

A solution of 8.72 g. of manganese nitrate hexahydrate, 7.34 g. of cupric nitrate trihydrate and 106.4 g. of aluminum nitrate nonahydrate in 593 g. of water and a solution of 16.7 g. of sodium sulfide nonahydrate and 39.4 g. of sodium hydroxide in 391 g. of water were treated in the same manner as in Example 1 to give a catalyst.

A mixed gas containing 200 p.p.m., calculated as $N_2$, of nitrogen oxides, 1,300 p.p.m. of $SO_2$, 10% volume of $CO_2$, 6% by volume of $O_2$ and 9.5% by volume of $H_2O$ was passed over 250 mg. of the said catalyst at a temperature of 400° C. and a velocity of 550 Nml. per minute in the presence of 130 p.p.m. of $NH_3$ to give a 50% removal of nitrogen oxides. Upon using 260 p.p.m. and 390 p.p.m. of $NH_3$, a 70% and 74% removal of nitrogen oxides, respectively, were obtained. When the treatment was continued for 96 hours in the presence of 260 p.p.m. of $NH_3$, 52% of nitrogen oxides was removed with a deterioration rate of 26%. With 2.5 g. of the catalyst, said gases were similarly treated to obtain a 63% removal of nitrogen oxides in the presence of 130 p.p.m. of $NH_3$ and a nearly 100% removal in the presence of 195 p.p.m., 260 p.p.m. and 390 p.p.m. of $NH_3$.

EXAMPLE 5

A solution of 2.39 g. of cupric nitrate trihydrate, 2.84 g. of manganese nitrate hexahydrate and 133.9 g. of aluminum nitrate nonahydrate in 657 g. of water and a solution of 5.46 g. of sodium sulfide nonahydrate and 49.6 g. of sodium hydroxide in 458 g. of water were treated in the same manner as hereinabove to give a catalyst.

A mixed gas containing 200 p.p.m., calculated as $N_2$, of nitrogen oxides, 1,200 p.p.m. of $SO_2$, 10% by volume of $CO_2$, 5% by volume of $O_2$ and 10% by volume of $H_2O$ was passed over 250 mg. of the catalyst at a temperature of 400° C. and a velocity of 500 Nml. per minute to give a 70%, 96% and nearly 100% removal of nitrogen oxides in the presence of 130 p.p.m., 260 p.p.m. and 390 p.p.m. of $NH_3$, respectively. With 2.5 g. of the catalyst, the gases were similarly treated to give a 74% removal of nitrogen oxides in the presence of 130 p.p.m. of $NH_3$ and a nearly 100% removal was obtained in the presence of 195 p.p.m., 260 p.p.m. and 390 p.p.m. of $NH_3$. With 250 mg. of the catalyst and 260 p.p.m. of $NH_3$, 81% of nitrogen oxides was removed when the treatment was carried out at 350° C. and 51% of nitrogen oxides was removed at 300° C. With 260 p.p.m. of $NH_3$, the mixed gases were similarly treated at 250° C. to obtain an 88% removal of nitrogen oxides using 2.5 g. of the catalyst and a nearly 100% removal was obtained using 5 g. of the catalyst.

EXAMPLE 6

The procedure was repeated in the same manner as in Example 2 except that a solution of 11.0 g. of cupric nitrate trihydrate, 13.1 g. of manganese nitrate hexahydrate and 159.6 g. of aluminum nitrate nonahydrate in 890 g. of water and a solution of 25.1 g. of sodium sulfide nonahydrate and 59.1 g. of sodium hydroxide in 587 g. of water were calcined at a temperature of 650° C. to give a catalyst.

A mixed gas containing 180 p.p.m., calculated as $N_2$, of nitrogen oxides, 1,200 p.p.m. of $SO_2$, 10% volume of $CO_2$, 5% by volume of $O_2$ and 10% by volume of $H_2O$ was passed over 0.5 g. of the catalyst at a temperature of 550° C. and a velocity of 500 Nml. per minute in the presence of 270 p.p.m. of $NH_3$ to effect a 71% removal of nitrogen oxides. The gases were treated in the same manner as above except for a temperature of 500°, 450°, 400°, 350°, 300° and 250° C. to give an 87%, 96%, 96%, 87%, 68% and 51% removal of nitrogen oxides, respectively. With 2.5 g. of the catalyst and a temperature of 155° C. in the presence of 270 p.p.m. of $NH_3$, 93% of nitrogen oxides was removed.

EXAMPLE 7

A solution of 4.03 g. of ferric nitrate nonahydrate, 2.86 g. of manganese nitrate hexahydrate, 2.41 g. of cupric nitrate trihydrate and 127.3 g. of aluminum nitrate nonahydrate in 647 g. of water and a solution of 8.2 g. of sodium sulfide nonahydrate and 47.2 g. of sodium hydroxide in 443 g. of water were treated to give a catalyst.

A mixed gas containing 350 p.p.m., calculated as $N_2$, of $NH_3$ and 5% by volume of $O_2$ was passsed over 2.5 g. of the catalyst at a temperature of 400° C. and a velocity of 500 Nml. per minute. No nitrogen oxides was formed from ammonia by reaction with oxygen. The procedure was repeated in the same manner as above except for the presence of 407 p.p.m., calculated as $N_2$, of $NH_3$ and the use of 2.5 g. of the catalyst, with the result that ammonia was completely degraded. The reactions are considered to take place as follows:

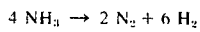

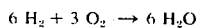

EXAMPLE 8

A solution of 5.81 g. of cobalt (II) nitrate hexahydrate, 4.82 g. of cupric nitrate trihydrate and 119.8 g. of aluminum nitrate nonahydrate in 624 g. of water and a solution of 142.8 g. of sodium sulfide monohydrate in 314 g. of water were used to give a catalyst.

The stack offgases containing 290 to 340 p.p.m. of nitrogen oxides, 1,500 to 1,900 p.p.m. of $SO_2$, 6 to 8% by volume of $H_2O$ and 5 to 10% by volume of $O_2$ were treated with 3.0 g. of the catalyst at a temperature of 400° C. and a velocity of 500 ml. per minute in the presence of 147 p.p.m. and 273 p.p.m. of $NH_3$, respectively to remove 45% and 95% of nitrogen oxides. With 336 and 462 p.p.m. of $NH_3$, a nearly 100% removal of nitrogen oxides was obtained, and with 462 p.p.m. of $NH_3$, no unreacted ammonia was detected.

EXAMPLE 9

A solution of 5.23 g. of manganese nitrate hexahydrate, 4.40 g. of cupric nitrate trihydrate, 82.0 g. of aluminum nitrate nonahydrate and 29.1 g of chromous nitrate nonahydrate in 585 g. of water and a solution of 10.0 g. of sodium sulfide nonahydrate and 40.5 g. of sodium hydroxide in 386 g of water were used to give a catalyst.

With the use of 250 mg. of the catalyst and 206 p.p.m. of $NH_3$, the procedure was repeated in the same manner as in Example 8 to remove 43% of nitrogen oxides; with the use of 302 p.p.m. and 420 p.p.m. of $NH_3$, 62% and 72% of nitrogen oxides were removed, respectively; and when 630 p.p.m. of $NH_3$ was used, 78% of nitrogen oxides was removed and no unreacted ammonia was detected.

What we claim is:

1. A process for reducing nitrogen oxide contained in stack offgases to nitrogen and water which comprises reducing the nitrogen oxide by contacting stack offgases containing nitrogen oxide, oxygen, and sulfur dioxide with ammonia in the presence of a catalyst consisting essentially of a heavy metal sulfide selected from the group consisting of copper sulfide, iron sulfide, and mixtures thereof at a temperature in the range of about 250° to 550°C, the ammonia being present in an amount of from about 0.67 to 4 times the stoichiometric amount of the nitrogen oxide.

2. A process as claimed in claim 1, wherein the said contacting is carried out at a temperature of 250° to 400°C..

3. A process as claimed in claim 1, wherein the heavy metal sulfide is used in an amount of about 0.05 to 70 percent by weight with respect to the weight of the catalyst.

4. A process as claimed in claim 1, wherein the amount of ammonia is from about 1 to 3 times the stoichiometric amount of nitrogen oxide.

* * * * *